United States Patent [19]

Trent

[11] Patent Number: 4,669,515

[45] Date of Patent: Jun. 2, 1987

[54] APPARATUS FOR MANUFACTURING MUSICIAN'S REED ASSEMBLIES

[76] Inventor: Robert L. Trent, 209 N. Washington St., Winchester, Va. 22601

[21] Appl. No.: 869,357

[22] Filed: Jun. 2, 1986

[51] Int. Cl.$^4$ .............................................. B27C 1/14
[52] U.S. Cl. .................................. 144/115; 144/2 R; 144/142; 144/144 R
[58] Field of Search ................. 84/453; 409/289, 291, 409/292, 310; 144/2 R, 114 R, 115, 134 R, 137, 144 R, 144 A, 142, 372

[56] References Cited

U.S. PATENT DOCUMENTS 4,273,170  6/1981  Herzberg et al. ............... 144/144 R
4,572,257  2/1986  Laker ................................. 144/2 R Primary Examiner—W. D. Bray
Attorney, Agent, or Firm—Gifford, Groh, VanOphem, Sheridan, Sprinkle and Dolgorukov

[57] ABSTRACT

A profiling apparatus for manufacturing musicians' reed assemblies to individual preference includes a rotating drum, to which is attached reed cane material, and a profiling blade for shaping the reed along with a supporting base and sides. The blade is attached to a rolling blade support member and is adjustable for cutting angle and depth. In a preferred embodiment the drum is translucent and illuminated from the interior to aid the operator in profiling the reed.

9 Claims, 13 Drawing Figures

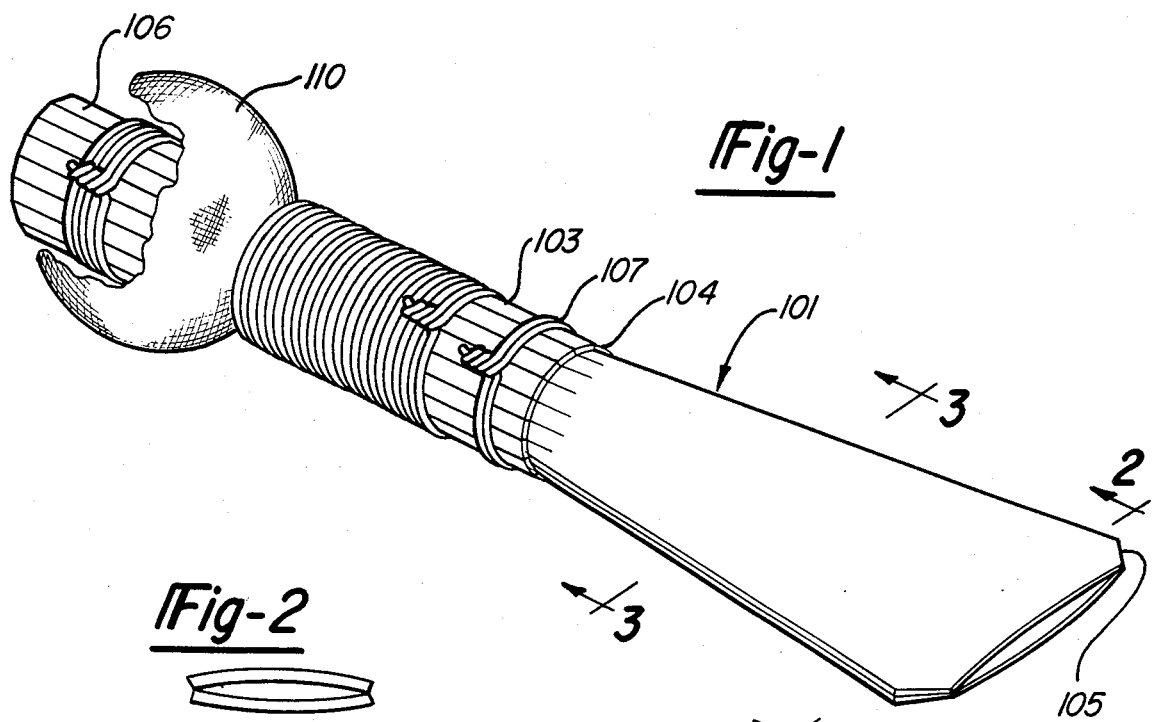
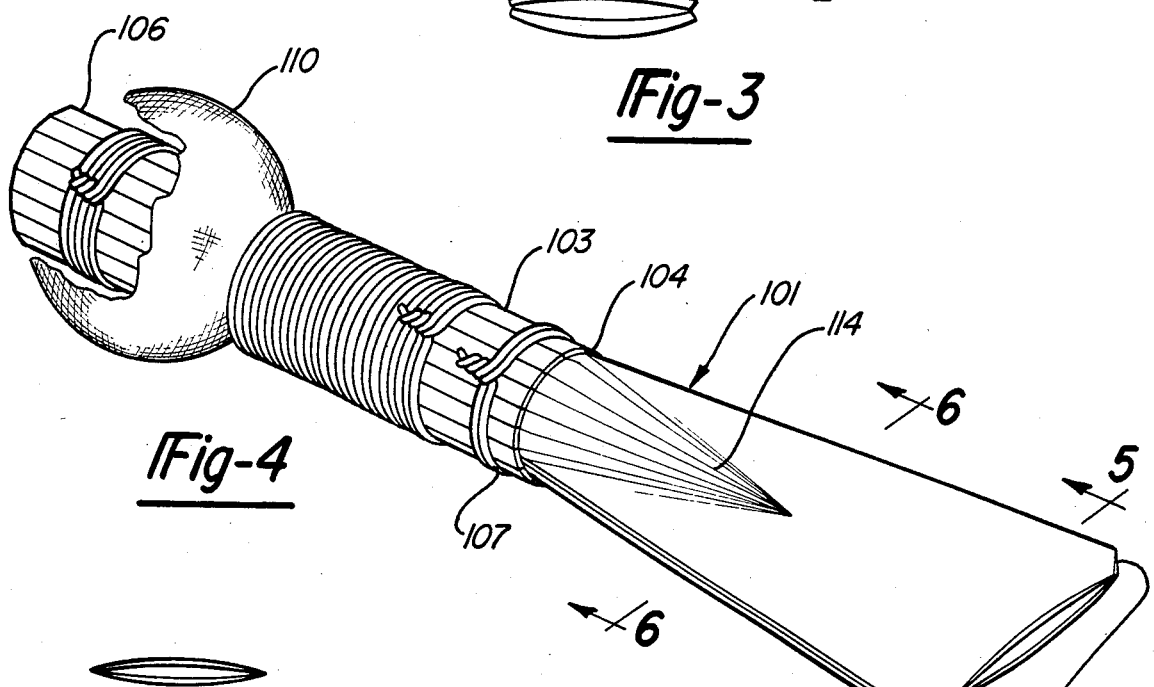

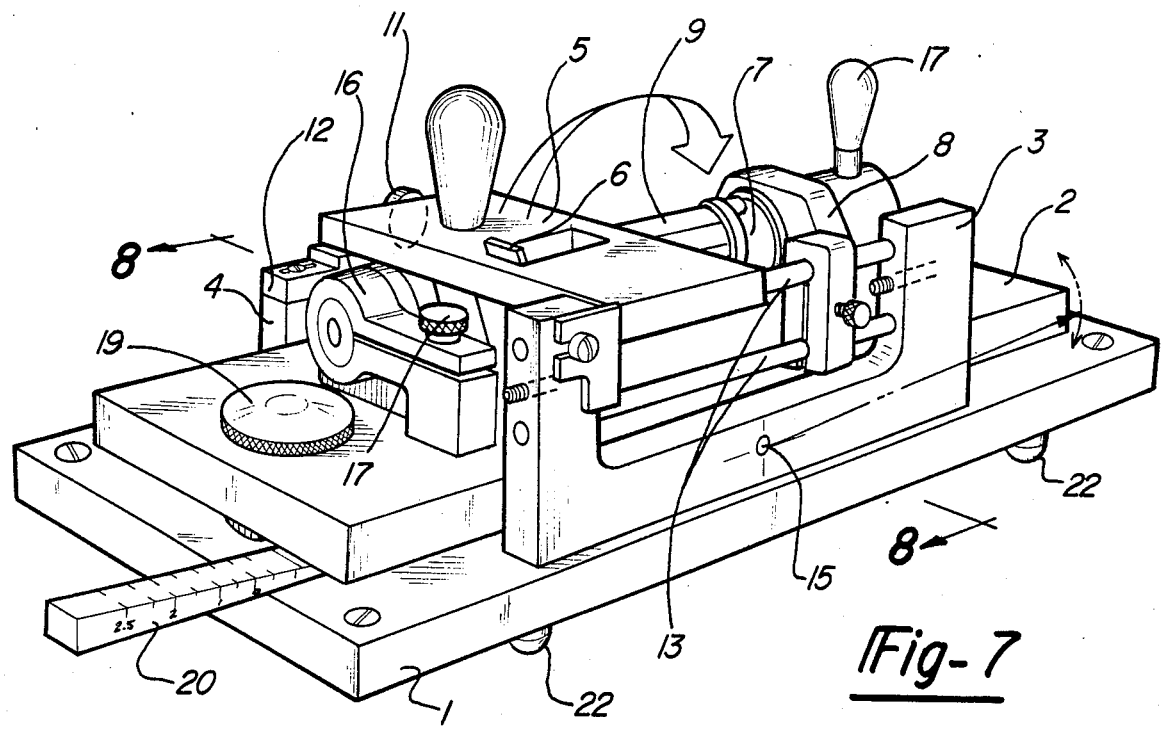
Fig-7
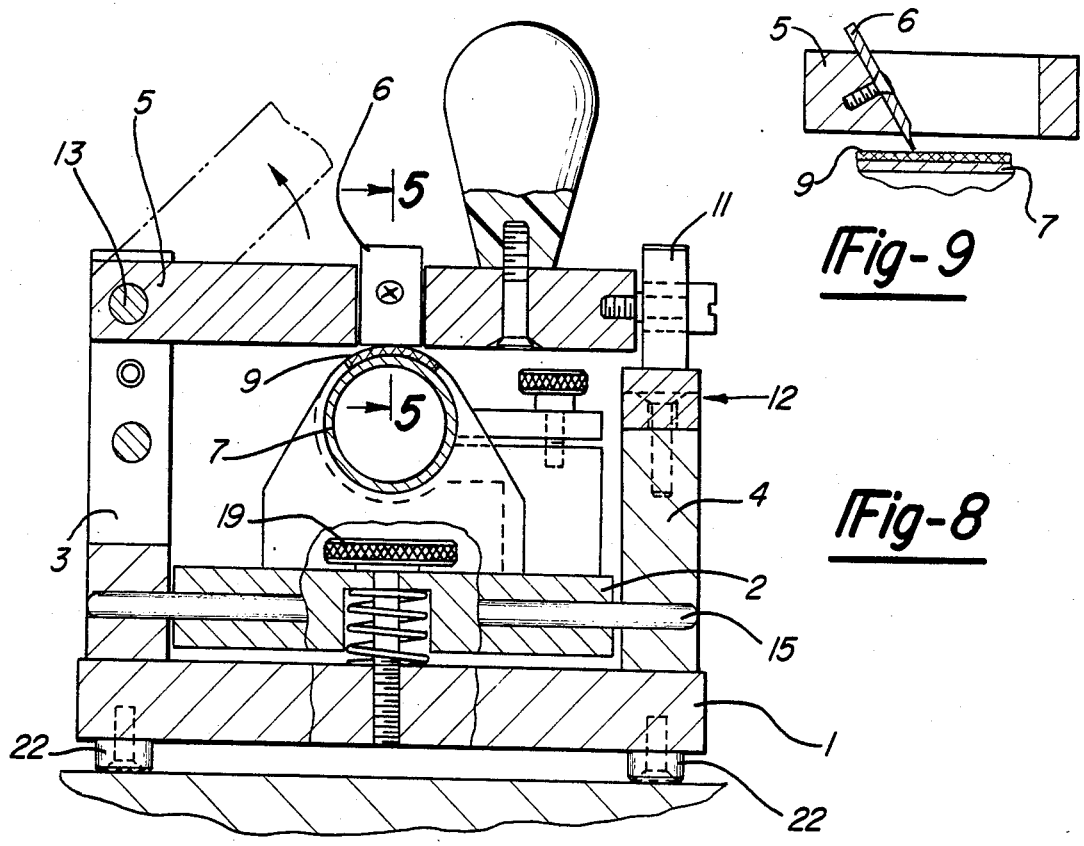
Fig-9
Fig-8

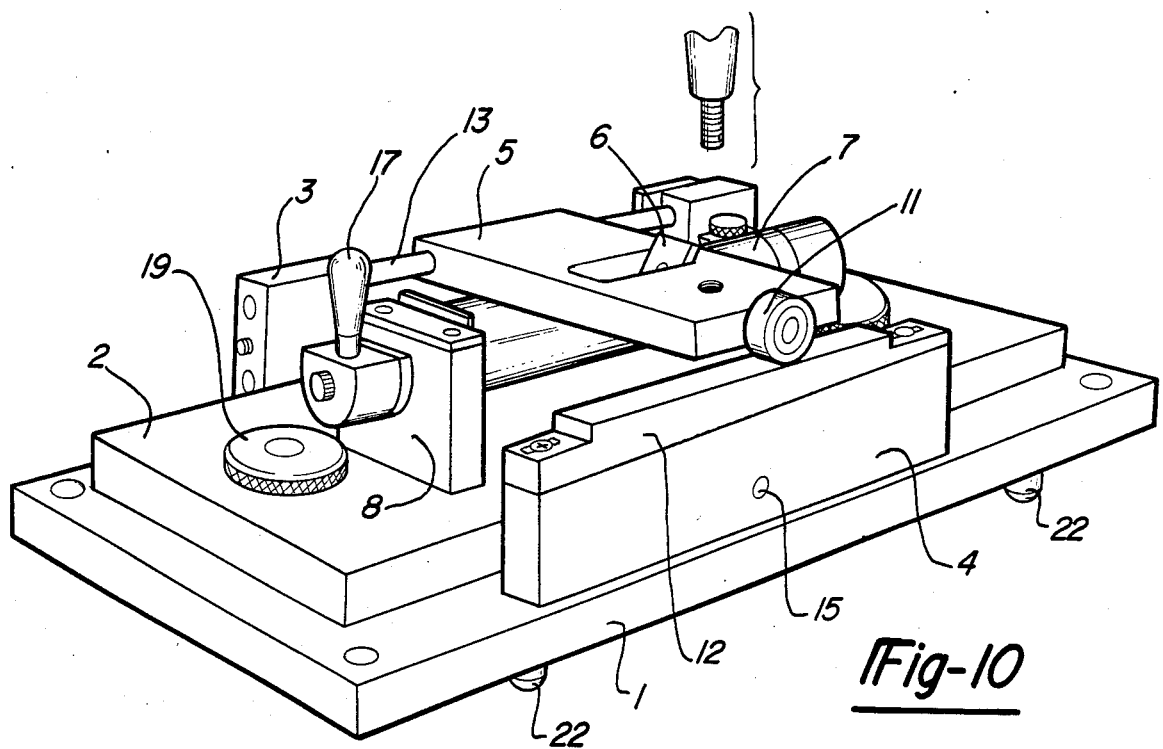
*Fig-10*
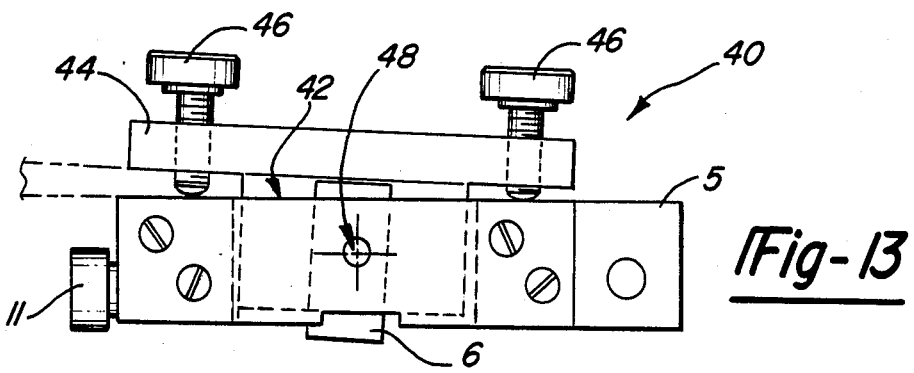
*Fig-11*  *Fig-12*  *Fig-13*

APPARATUS FOR MANUFACTURING MUSICIAN'S REED ASSEMBLIES

BACKGROUND OF THE INVENTION

I. Field of the Invention

This invention and disclosure represents one of a series stemming from a systems engineering analysis of the procedures and apparatus currently used by professional musicians, professors of music, and students of double reed instruments, for the fabrication, tailoring and adjustment of reed assemblies used with such instruments.

II. Description of the Prior Art

The two fundamental, recognized and generally-used reed assembly configurations employed with the bassoon are identifiable as the "French" type and "German" type. The major differences between these two, from a physical conformation and fabrication standpoint rather than a sound-producing viewpoint, are in the shape, cross-sectional areas, and dimensions of the lateral tapers of the "lay" of the reeds, as shown in the attached drawings, in which:

FIGS. 1 through 3 represent a pictorial illustration of the "French", or single-wedge reed assembly, showing the fairly uniform, sloped configuration of the lay of the cane material from the shoulder to the tip, and:

FIGS. 4 through 6 are similar views of the "German", or double wedge type of reed assembly, illustrating the thickened heart or arched cross-sectional regions of the cane material near the shoulder, and change in slope of the lay in the region of the tip.

Another type of longitudinal contour of reed assemblies, normally referred to as the "parallel" type, because of difficulties in fabrication, control, and inability to meet individual performer preferences and types of sounds produced, has not been widely applied, nor is it in general use. In the parallel type, uniform thicknesses of the reed cane material must be maintained throughout the lay.

The reed assembly in FIG. 1 delineates the fabrication methods and treatments which are applied to the basic reed cane material, designated 101, prior to the assembly procedures, particularly to those cross-sectional regions related to the "lay" or tip end of the assembly, designated 105. The lay end is considered to originate at the shoulder 104, and extend to the tip 105. The tube portion 103 incorporates three wrappings of discrete wire sections; the first 107 close to the shoulder, and the second and third wire wrappings approaching the Bocal end 106 of the assembly. The third wire wrapping is covered with binding 110 usually consisting of a combination of thread and cementing organic materials. The first and second wire sections are thereby left available for adjustment of the pressure applied to the cane reed material at the tip end of the reed assembly.

The reed assembly of FIG. 4, illustrating the "German" or double-wedge type, incorporates the same features and includes the same designators for each of them. The marked differences comprise the clearly indicated first wedge section of the lay 111 and the second wedge section 112. The other features are the "heart" or arched cross-sectional conformation 114 near the shoulder, and the tapered cross-section at the tip of the reed assembly.

The double wedge contour is probably the most popular, and approximations thereto most common, because of the number of variants possible to meet individual performer preferences, and the pitch and timbre of the sounds produced. It is to be understood that the reed cane material as supplied commercially is in the form of strips of cane with the exterior surfaces intact, gouged-out to a thickness of about 1.02–1.06 mm., an internal radius of approximately 11.4 mm., and cut into strips about 117 mm. long. Such individual strips are mounted on a cylindrical drum and "profiled" from the intended shoulder to the tip area; they then are reversed on the drum, and the other end again profiled. It is therefore critical that each end be profiled exactly the same so that both cane sections of the individual reed assemblies will be identical, and that each such sub-operation be controllably repeatable, so that successively processed reed assemblies will be consistently and readily reproducible.

A number of machines and apparatus are commercially marketed which are purportedly capable of enabling such double-wedged lay contours to be achieved. All such profiling apparatus examined and observed to date possess several disadvantages and inadequacies which, in combination, make it impossible to even approximate the idealized double-wedge lay contours, or to reproduce with any precision a contour which has been found capable of providing a "concert" quality reed assembly meeting the individual bassoonist's criteria of sound quality acceptability. In addition, since the initial cost of such equipment is in the order of $500.00, that cost materially limits the ability of individual bassoonists, professors and students to procure such apparatus.

SUMMARY OF THE PRESENT INVENTION

It is an object of the present invention to overcome the identified design deficiencies of presently-available profiling equipment by providing means for selectively removing material from the exterior surfaces of the cane material mounted on the cylindrical mandrel, or roller drum, within readily adjustable areas, both at angles with the longitudinal axis of the cylinder, and with the rotational axis of the cylinder, and combinations thereof. The major design modification involved in achieving these capabilities is that of providing means for modifying the angle that the profiling blade makes with the longitudinal axis of the mounting cylinder by swiveling the mounting cylinder through closely controlled and reproducible angles, about its central axis. In all of the presently available equipment, attempts are made to modify that angle by placement of shims under the supporting means for the blade-holding member. Since the blade-holding member is fabricated of ½ inch thick aluminum, one end of which is supported by a ¼ inch drill rod passing through the ½ inch block, and other end by a roller bearing, the drill rod effectively provides line contact and the roller bearing a point contact. The combination of the two defines uniquely the plane of travel of the blade-holding member and blade. In some designs which have been observed, the roller bearing rides on a flat surface, termed a "limit-bar". In others, the roller bearing rides upon an edge of a right-cylindrical surface. In the limit-bar case, shims have been introduced at either or both ends of the limit-bar supports in an attempt to modify the angle of travel of the blade with respect to the longitudinal axis of the mounting drum cylinder. In the case where the roller bearing rides on the edge of a cylinder, material has been removed from the surface of the cylinder, in similar attempts. The effects of both of these attempts have been that the edge of the profiling blade assumes an angle with the surface of the cane material and is no longer parallel with it. The depth of cut of the blade into the cane material is also modified. Both of these effects become exaggerated when the mounting drum is rotated so that the profiling blade can address the opposite edges of the cane material.

The design modifications incorporated to provide for controllable and reproducible removal of cane material along the longitudinal axis of the mounting cylinder at a constant depth of blade penetration into that material, include: (a) adjustment of the plane angle of the blade travel with respect to the longitudinal axis of the mounting cylinder by angular rotation of that cylinder about its center-line; and (b) provisions for turning the mounting cylinder clockwise and counter-clockwise about its longitudinal axis through clearly calibrated angles, and preferably clamping it at the desired angle. In all previously known designs, while the mounting cylinder is rotatable about its axis, there have been no means provided for monitoring the angle through which it had been rotated and the cylinder had to be held manually in a desired position since no handle or provision for clamping it in that position were furnished.

Another object of the invention is to provide means for visual inspection of the cane material during the profiling operations. At the following stages in the fabrication of reed assemblies, it is common practice to hold the reeds up to a source of illumination whereby the varying thicknesses of the cane material are observed by the shading induced by the cane material. It is obvious from observing the typical reed assemblies of FIGS. 1 and 4 that, when held up to a source of illumination, the shadings induced by both thicknesses of the cane material will be observed, and that it is difficult or impossible to determine differences between the thicknesses of each individual element making up the assembly. The present design includes means for employing a mounting cylinder fabricated of a translucent material, with both ends of the cylinder being illuminated, using miniature lamp sources. The illumination sources are available in white, red, and green colorations. From a purely physical complementary light transmission viewpoint, better color and intensity gradations, proportionate with the varying thicknesses of cane material, should be observable by using a green source of illumination. An alternative method of varying the color of the light flux introduced at the ends of the translucent cylinder employs uncolored lamp sources and introduces colored film strip sections between the lamps and each respective end of the cylinder.

A further object of the invention is to provide means for adjustment of the plane through which the blade will travel to make up for manufacturing and fabrication tolerances. The adjustment provisions enable the blade-holding member to be adjusted so that it will travel parallel with and at a constant distance from the mounting surface and at a right angle to that surface. This adjustment would be performed on inspection of a completed profiling apparatus, and would not be required to be modified thereafter.

A still further object of the invention is to provide means for the fabrication and manufacture of a complete profiling apparatus at low costs, using plastic-molding techniques, and incorporating metallic inserts at locations of high stress, and where the plastic materials might be subject to abrasion and wear.

BRIEF DESCRIPTION OF THE DRAWINGS

Other objects and features of the invention may be better understood from a consideration of the following detailed description when read in accordance with the attached drawings, in which:

FIGS. 1 through 3 represent a pictorial illustration of the "French", or single-wedge reed assembly, showing the fairly uniform sloped configuration of the lay of the cane material from the shoulder to the tip, and FIGS. 4 through 6 are similar views of the "German", or double wedge type of reed assembly, illustrating the thickened heart or arched cross-sectional regions of the cane material near the shoulder, and change in slope of the lay in the region of the tip.

FIG. 7 is a perspective view of the improved profiling apparatus of the present invention illustrating the basic concept of providing for the adjustment of the angle of traverse of the profiling blade with respect to the top surface of the roller drum upon which the cane material is mounted, by rotating the support platform on which the roller drum is mounted through controllable and measurable small angles of rotation. The roller drum is capable of being turned about its longitudinal axis, and clamped in such positions, so that the profiling blade can address the edges of the cane material;

FIG. 8 is a combined sectional and end view of the profiler, showing the method of attachment and adjustment of the support platform and the clamping feature for the roller drum;

FIG. 9 is a fragmentary sectional view of the profiling blade with respect to the mounted reed and drum;

FIG. 10 is an alternate perspective view of the apparatus, to illustrate the measures taken to provide for the adjustments necessary to compensate for manufacturing dimensional tolerances;

FIG. 11 is a pictorial representation showing optional features, the major points of difference with FIG. 7 being: (a) the end-support details for mounting the roller drum have been modified to provide for miniature lamp illumination of a translucent roller drum; and (b) the end support details include modifications to enable automatic changes in the slope of the roller drum, as the roller drum is rotated clockwise and counter-clockwise about its longitudinal axis to address the edges of the cane material. Details of the cam and cam-follower designs which are actuated on rotation of the roller drum are shown.

FIGS. 12 and 13 illustrate an additional optional provision. In order to maintain intact the thicker "heart" or arched cross-sectional areas near the center of the reed in the region of the shoulder, because of the ½ inch width of the profiling blade which would remove material from those regions as the roller drum is rotated to address the edges of the cane material, the cutting plane of the blade must be changed clockwise and counter-clockwise, in turn, as each edge of the cane is profiled. FIGS. 12 and 13 show that the blade-holding member has been divided into three sections, with the center section on which the blade is mounted capable of being rotated about the centerline of the blade, to provide this required degree of freedom. As brought out in the following detailed descriptions of each of the drawings, the same wedge-shaped gauge designed to calibrate and set the angle of the support platform is also calibrated on its top face to measure various required angles of the blade.

DETAILED DESCRIPTION OF A PREFERRED EMBODIMENT OF THE PRESENT INVENTION

FIG. 7 illustrates a preferred embodiment of a profiling apparatus fabricated in accordance with the principles of the present invention and comprising a base platform 1; a support platform 2; a first side support member 3; a second side or limit-bar support member 4; a blade-holding member 5, to which is firmly mounted and affixed the blade 6; and the roller drum 7, to which is clamped the reed cane material 9 to be profiled. As is clearly evident from the drawing, the plane of travel of the blade holding member 5 is uniquely defined by the combination of the line support characteristics of the drill-rod bearing 13, which passes through that member, and the point of contact between the bottom surface of the roller bearing 11 and the top surface of the limit-bar 12, which is affixed to the limit-bar support member 4. The first side support member 3, which defines the position of the drill-rod bearing 13, and the limit-bar support member 4, are both mounted perpendicular to the base platform. Both of the support members 3 and 4 are drilled to provide fixed bearings for the axle 15, which passes through the support platform 2 at its centerline, and upon which the support platform is free to rotate through angles limited by the contact between either end of the support platform 2 and the base platform 1. Since the roller drum 7 is mounted by axles passing through the end-bearing members 8 located at each end of the roller drum, and these bearing members 8 and drum 7 are mounted on the support platform 2, changes in the angle of the support platform 2 with respect to the base platform 1 result in identical angular changes between the plane of the blade holding member 5, and therefore the plane of travel of the blade 6, which is firmly affixed to the blade holding member, with respect to the top surface of the roller drum 7 on which is mounted the reed cane material 9. The calibration, adjustment and locking of that angle is performed by the use of the gauge 20, and rotating the two set-screws 19 provided at both ends of the support platform 2.

The complete profiling apparatus is designed to be mounted to a worktable surface by means of four wood screws and four rubber/nylon bumpers 22 are provided on the bottom surface of the base platform to act as noise reducers and isolators. The roller drum 7, upon which the reed cane material 9 is clamped, is free to rotate about its longitudinal axis, under the control of the handle 17, to fix the roller drum at any desired angle of rotation about its longitudinal axis. At the opposite end of the roller drum 7 is the clamp 16, which can be tightened about the roller drum shaft to assure that the desired angle of rotation will be maintained during profiling operations. The surface of the clamp 16 carries angular calibration indicators through angular changes of the roller drum up to about 30 degrees, clockwise and counter-clockwise.

FIG. 8 is a combined end/sectional view of FIG. 7, and shows the various support and adjustment provisions described previously. The mounting of the limit bar 12 and the first side support member 3 on the base platform 1, and the axle 15, passing through the support platform 2 are shown. One of the set screws 19, both of which are spring-loaded, which in combination adjust and lock the support platform to obtain desired angles between the plane of travel of the profiling blade 6, and the surface of the roller drum 7 and cane material 9, is depicted. The plane of travel of the blade-holding member 5 is fixed at one end by the line contact between it and the drill rod bearing 13 on the right-hand side. The point of contact between the roller bearing 11 and limit bar 12 defines the plane on the left-hand side. As indicated, the blade-holding member 5 can be rotated on the drill rod bearing 13 to permit visual inspection of the condition of the cane material, adjusting the depth of penetration of the profiling blade 6, and providing freedom of access to the roller drum 7 for mounting the cane material 9. The details of how the clamp 16, in combination with its associated set-screw, operate to clamp the roller drum at desired angles of rotation about the roller drum's longitudinal axis are shown.

FIG. 10 exemplifies another preferred embodiment of a profiling apparatus constructed in accordance with the principles of the invention, and comprises essentially the identical basic structural elements illustrated in FIG. 7, namely: a base platform 1, a support platform 2, the first side support member 3, and the second side limit-bar support member 4. The perspective view of FIG. 10 has been shown 180 degrees from that of FIG. 7 specifically to clarify details of the overall assembly not shown therein. For instance, the design of the limit-bar 12 and it's support member 4 indicates the measures taken to provide for adjustments necessary to compensate for manufacturing tolerances. The nominal design height of the top surface of the limit-bar 12, upon which the roller-bearing rides, is two inches. The limit-bar 12 and its support member 4 meet at an angle of two degrees from the horizontal. They are secured and held in alignment by means of bolts at each end. The limit-bar 12 contains slotted bolt holes, enabling horizontal adjustment of the limit-bar 12 by about $\frac{1}{8}$ inch each way. That amount of movement corresponds with a change in height adjustment of the top surface of about ±0.004 inches or ±0.1 mm, adequate to compensate for fabrication variances.

The method divulged previously for providing colored illumination sources to furnish suitable light fluxes to the translucent roller drum 7 using miniature lamps cited their commercial availability in the colors of red, green and blue. Since such lamps are limited in terms of their light flux generation capabilities and thus may not be capable of providing sufficient flux when the apparatus is located in areas where the ambient illumination levels are high, an alternative is proposed herein. Commercial Ozalid/Ammonia film development processes produce projection film transparencies in a wide range of colors.

Both ends of the roller drum 7 are provided with shoulders about $\frac{1}{2}$ inch in diameter and 1/16th of an inch high. These shoulders bear upon the inside faces of the end support members, to maintain the position of the roller drum. Sections of colored film transparency material, furnished with $\frac{1}{4}$ inch rounded slots, and about 1.25 inches wide, extend downwards to contact the support platform 2 surface and are inserted between the inside faces of the end bearing members 8 and the roller drum 7 at each end. Clear light bulbs of the required wattage provide the desired light flux and are used instead of the colored miniature lamps.

FIG. 11 is a pictorial representation of the design and fabrication details of the end-bearing members 8, for the roller drum axles. In order to enable the longitudinal axis of the roller drum automatically to assume angles with respect to the support platform 2, round $\frac{3}{8}$ inch spring loaded bearings 30 act as rotatable and elevatable support members. A $\frac{3}{8}$ inch diameter hole is drilled through the centerline of the part from the top, and an end-mill used to provide a flat surface upon which the round bearing normally rides. In that normal position, with the roller drum 7 axis parallel to the support platform, the round bearings 30 are maintained under spring-loading in that position by means of the spring 32. The clearance holes in the end support members 8 for the roller drum 7, which also passes through clearance holes in the round bearings 30, are elongated and shaped to permit both angular and vertical deflections of the axle. The round bearing rides vertically upwards, while maintaining alignment of the roller drum 7. The exploded sub-view of FIG. 11 illustrates the mechanism used to effect elevation of one end of the roller drum axle under the control of the handle 17 as it is rotated, turning the roller drum 7 both clockwise and counter-clockwise with respect to the longitudinal axis of the roller drum. The handle 17 is affixed to the collar 34 which is fastened to the roller drum axle. On the rear face of that collar 34 is mounted a detachable cam 36. The edge of this cam 36 rides upon the cam follower 38 which is mounted on the end support member 8 directly under the centerline of the bearing 30. The pattern of this cam is symmetrical about its vertical axis, and is determined by the amount of elevation of that end of the roller drum 7 necessary to cause it to assume the desired angle with the support platform 2, considering the other end bearing of the roller drum to remain fixed vertically but rotatable and free to assume the same angle. Unlike most cam and cam-follower mechanical configurations, in this case the cam-follower remains physically fixed in position, whereas the cam itself provides the vertical motion to the roller drum axle, thereby controlling the slope of the roller drum since the opposite end of the roller drum remains fixed vertically because of the spring-force exerted on the round bearing and that bearing is only required to assume the same angle which it is free to do.

In its normal position, with the handle 17 vertical, the roller drum 7 remains parallel with the support platform 2, and as described previously, its top surface is parallel with and at a fixed distance from the plane of travel of the profiling blade 6.

The pattern of the cam 36 is symmetrical about its vertical axis, so that identical changes in the angle of the roller drum 7 would be incurred as the cam is rotated by the handle in each direction of rotation of the roller drum about its longitudinal axis. Based upon the standardized dimensions established by suppliers of unprofiled reed cane material, it has been determined that the maximum angle of rotation required of the roller drum 7 from its normal position, with the centerline of the profiling blade 6 aligned with the centerline of the mounted reed cane material, is about 30 degrees. With those angles of rotation, clockwise and counter-clockwise, the centerline of the blade would be directly centered over the edges of the reed cane material.

The cam pattern can therefore be individually adjusted and modified, after demounting it from the collar 34, to meet operator's preferences, by filing the edges of the cam which contact the cam-follower, maintaining symmetry about the vertical axis of the cam, so that the elevation of the roller drum axle at the end being manually rotated, which corresponds with the desired angle between the roller drum surface and plane of travel of the blade, can be achieved, in accordance with the following tabulation:

| Desired Angle Between Roller Drum and Blade in Degrees | Elevation Required in Inches |
| --- | --- |
| 0.5 | 0.048 |
| 1.0 | 0.096 |
| 1.5 | 0.144 |
| 2.0 | 0.192 |

FIGS. 12 and 13 provide a view of the redesigned blade-holding member subassembly 40 to enable the angle that the blade 6 makes with the surface of the roller drum 7 to be rotated through small angles clockwise and counter-clockwise from the normal horizontal position of the blade cutting edge, under the control of the operator. In addition, the redesigned subassembly 40 can be installed as part of the profiler assembly without any other changes being required, except for making use of the already built-in adjustment features to compensate for manufacturing and fabrication tolerances. The subassembly 40 comprises essentially the following: a center section 42 which incorporates the angled recess for mounting the blade 6 and for chip clearance, and angle adjustment and locking member 44 equipped with set-screws actuated by handles 46, the center section being rotatable about the centerline of the blade by means of the bearings 48.

The angle adjustment feature consisting of the adjustment member 44 and its associated set screws 46 operates in the same fashion as the provisions for adjustment of the angle that the support platform 2 makes with the base platform 1. As each edge of the reed cane material 9 is to be addressed in turn, the blade angle can be controlled by using the referenced set screws 46 and locked in the desired position. This feature is intended to be used when addressing the edges of the cane material, or approaching them, so that the thicker "arched" section of the cane can be maintained despite the finite width of the blade.

It is obvious from the foregoing descriptions that the invention provides a novel apparatus for the profiling reed cane material for use in the fabrication of reed assemblies. Although the invention has been described in relation to specific embodiments and with reference to specific features on the drawings, it is to be understood that these are merely illustrative, and that further embodiments and modifications will readily occur to one skilled in the art. For instance if higher levels of light flux are considered necessary to provide adequate distinction and shading of the reed cane material mounted on the roller drum because of ambient illumination levels, and the miniature lamps as illustrated are unable to produce such higher levels, larger lamps, such as small flashlight bulbs, can be used. Additionally, it would be possible for one of ordinary skill in the art to arrange the roller drum end supports so that the drum can be removed and switched end for end, without removing the cane therefrom, for the convenience of the user in profiling the other end of the cane material.

I claim:

1. A profiling apparatus for manufacturing musician's reed assemblies, said apparatus comprising:
   a base platform,
   a first side support and a second side support mounted to and extending from said base platform, said first side support including a flat roller bearing support surface at the top of said first side support and said second side support including an elongated rail support;

a profiling blade support member pivotally and slidably secured at a second end to said elongated rail support of said second side support, said blade support including a roller bearing rotatably secured to a first end wherein said roller bearing is supported on said roller bearing support surface of said first side support;

a profiling blade adjustably mounted to said blade support member;

a support platform pivotally mounted to said first and side supports, said support platform mounted substantially parallel to and spaced above said base platform;

means for adjusting the angular position of said support platform relative to said base platform; and a roller drum assembly mounted to said support platform, said roller drum assembly comprising end support members secured to said support platform and a roller drum rotatably supported by said support members wherein said reed cane material is removably mounted to said roller drum;

wherein said roller drum is disposed between said first and second side supports such that said profiling blade mounted to said blade support member contacts said reed cane material in order to profile said reed cane material.

2. The profiling apparatus as defined in claim 1 wherein said end support members of said roller drum assembly include a cam and cam-follower and at least one spring-loaded ball bearing, said cam members and ball bearing interacting to control the rotation of said roller drum whereby rotation of said roller drum causes one end of said roller drum to be automatically elevated in relation to said support platform in order to enable selective removal of portions of said reed cane material.

3. The profiling apparatus as defined in claim 1 wherein said profiling blade support member includes means for rotatably adjusting the angle of said profiling blade from a position tangent to said roller drum through various angular positions.

4. The profiling apparatus as defined in claim 1 wherein said roller drum is made of a translucent material.

5. The profiling apparatus as defined in claim 4 wherein said translucent roller drum is illuminated internally by lamp means mounted externally of said roller drum.

6. The profiling apparatus as defined in claim 5 wherein said lamp means is mounted in said end support members.

7. A profiling apparatus for manufacturing musician's reed assemblies, said apparatus comprising:
a base platform,
a first side support and a second side support mounted to and extending from said base platform, said first side support including a flat roller bearing support surface at the top of said first side support and said second side support including an elongated rail support;

a profiling blade support member pivotally and slidably secured at a second end to said elongated rail support of said second side support, said blade support including a roller bearing rotatably secured to a first end wherein said roller bearing is supported on said roller bearing support surface of said first side support;

a profiling blade adjustably mounted to said blade support member;

a support platform pivotally mounted to said first and second side supports, said support platform mounted substantially parallel to and spaced above said base platform;

means for adjusting the angular position of said support platform relative to said base platform; and a roller drum assembly mounted to said support platform, said roller drum assembly comprising end support members secured to said support platform and a roller drum rotatably supported by said support members wherein said reed cane material is removably mounted to said roller drum;

wherein said roller drum is made of a translucent material and wherein said roller drum includes means for illuminating said roller drum, said illuminating means being disposed in said end support members such that said reed cane material mounted on said roller drum can be observed during the profiling whereby the varying thicknesses of the reed cane material can be observed and monitored.

8. The profiling apparatus as defined in claim 4 wherein said roller drum is provided with colored film transparencies between said illuminating means and said roller drum surface thereby causing the light provided by the illuminating means to assume a predetermined color spectra in order to enhance distinguishing between varying thicknesses of said reed cane material mounted on said roller drum.

9. The profiling apparatus as defined in claim 1 wherein said apparatus is constructed of molded plastics materials, reinforced with metallic inserts, whereby said inserts provide superior strength and wear characteristics to said apparatus.

* * * * *

UNITED STATES PATENT AND TRADEMARK OFFICE
CERTIFICATE OF CORRECTION

PATENT NO. :   4,669,515

DATED      :   June 2, 1987

INVENTOR(S) :  Robert L. Trent

It is certified that error appears in the above-identified patent and that said Letters Patent is hereby corrected as shown below:

Col. 9, line 12 after "and", insert --second--.

Signed and Sealed this

Third Day of November, 1987

Attest:

DONALD J. QUIGG

Attesting Officer

Commissioner of Patents and Trademarks